United States Patent [19]

Torrence et al.

[11] 3,917,799

[45] Nov. 4, 1975

[54] SULFUR OXIDE ADSORPTION AND RECOVERY

[75] Inventors: Samuel L. Torrence, Charleston, S.C.; William C. Walker, New York, N.Y.

[73] Assignee: Westvaco Corporation, New York, N.Y.

[22] Filed: Feb. 26, 1973

[21] Appl. No.: 335,687

Related U.S. Application Data

[63] Continuation of Ser. No. 752,253, Aug. 13, 1968, abandoned.

[52] U.S. Cl. .................................. 423/244; 423/576
[51] Int. Cl. ...................... C01b 17/02; C01b 17/00
[58] Field of Search ..................... 423/242, 244, 576

[56] References Cited
UNITED STATES PATENTS
2,839,365  6/1958  Murray .............................. 423/574
3,284,158  11/1966  Johswich ............................. 423/532
3,345,125  10/1967  Kruel et al. .......................... 423/244

FOREIGN PATENTS OR APPLICATIONS
749,940  0000  Canada .............................. 423/244

*Primary Examiner*—Oscar R. Vertiz
*Assistant Examiner*—Gregory A. Heller
*Attorney, Agent, or Firm*—Brumbaugh, Graves, Donohue & Raymond

[57]  ABSTRACT

A process for removing sulfur oxides from gas streams whereby the sulfur oxides are adsorbed onto a carbonaceous adsorbent and recovering sulfur dioxide from the spent adsorbent by contacting the adsorbent with an oxide-reducing gas, i.e., hydrogen sulfide, whereby the adsorbed sulfur oxides having been adsorbed as sulfuric acid and sulfur trioxide are reduced.

11 Claims, 1 Drawing Figure

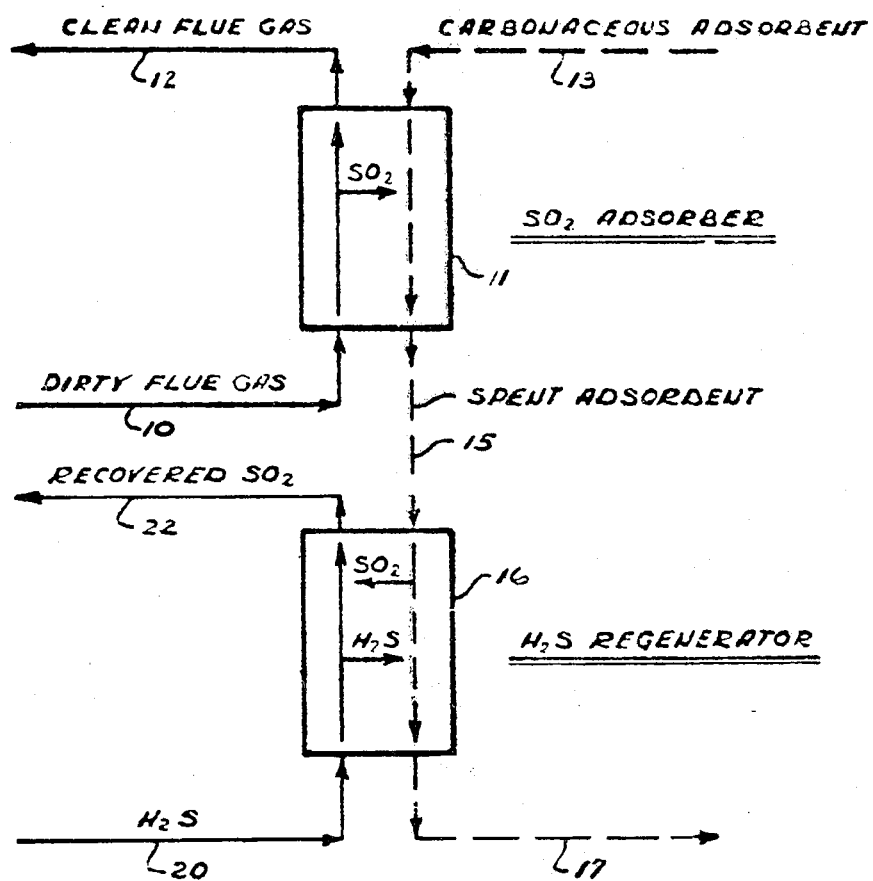

SULFUR OXIDE ADSORPTION AND RECOVERY

This is a continuation of application Ser. No. 752,253 filed Aug. 13, 1968, now abandoned.

This invention relates to a process for removing sulfur oxides from oxygen-containing gas streams by adsorption onto a carbonaceous adsorbent and recovering sulfur dioxide from the spent adsorbent. More specifically, this invention relates to removal of sulfur dioxide and sulfur trioxide from flue gases by adsorbing the oxides onto an activated carbon and regenerating the spent carbon by contacting with hydrogen sulfide. The regenerated adsorbent is then recycled to the sulfur oxide adsorber and sulfur dioxide is recovered.

Many industrial plants employ fuels having a sulfur-content as high as three percent or more. These fuels, primarily coal and fuel oil, upon combustion, form undesirable pollutants, including sulfur oxides. Removal of these sulfur oxides from effluent gas streams has long been a troublesome problem. The economic advantages of this invention enable power plants to use high sulfur-content fuels without fear of air pollution. In addition, other industrial effluents, such as those from pulp mills, contribute to sulfur oxide pollution. For the purposes of this invention, sulfur oxides are herein defined as sulfur trioxide and sulfur dioxide. The presence of these sulfur oxides in waste gases passed into the atmosphere results in considerable amounts of pollution.

The removal of sulfur oxides from flue gases may be achieved by chemical or physical processes, using liquid or solid substances. The most successful combinations of these processes are wet scrubbing with liquids and dry methods which employ contacting with solid substances. The objective of all the processes is to prevent the emission of the noxious and offensive sulfur oxide gases into the atmosphere. Wet scrubbing lowers the temperature of the gas stream to that of the washing water, which is considerably lower than the temperature necessary to retain the buoyancy necessary to disperse the emission over a wide area. In contrast, dry processes have the advantage over wet processes of maintaining a high emission temperature.

The dry processes contact adsorbent material with the gases to be cleaned. In order to keep the adsorbent inventory at a minimum and the plant from being excessively large, the adsorbent must have a high adsorbing efficiency. High efficiency means a high gas throughput per unit of adsorbent in the contacting equipment. In addition, the adsorbent must be relatively hard with minimum attrition; most importantly, the adsorbent must be easily and inexpensively regenerated. Included among the several dry processes that have been developed are a catalytic oxidation process (U.S. Pat. No. 3,318,662), a manganese nodule process (U.S. Pat. No. 3,330,096), an alkalized alumina process, (U.S. Pat. No. 2,992,884) and activated char processes (U.S. Pat. Nos. 2,992,895 and 2,992,065). One of the major costs in these dry processes is the charge for material used to react with the sulfur oxides. For instance, in the alkalized alumina process producer gas is the reactant; whereas in the activated char process the reactant is the carbonaceous adsorbent itself. One of the principal disadvantages of these processes, particularly the activated char process, is the expensive regenerating costs. A difficulty in developing an economical process is that large volumes of gas containing low concentrations of sulfur oxides, i.e., on the order of 0.1 to 5.0 percent by volume must be processed. Because of this difficulty the activated char process has the disadvantage of being forced to use large adsorber sizes.

The activated char process removes sulfur oxides from a gas stream by using a carbonaceous adsorbent, such as an activated char, long recognized as a good adsorbent. In this process the activated char catalytically oxidizes sulfur dioxide to sulfur trioxide which is adsorbed as such, or is combined with water vapor to form sulfuric acid, both of which adhere tightly to the surface of the activated char. In the normal combustion of fuels there are present in the flue gas amounts of oxygen and water in excess of that needed to carry out the oxidation of sulfur dioxide and the hydration of the resulting sulfur trioxide to form sulfuric acid. The spent char is then regenerated at temperatures above 300°C, whereupon the sulfuric acid splits into water and sulfur trioxide, the latter being reduced to sulfur dioxide with the carbonaceous adsorbent serving as a reducing agent. One of the disadvantages of this process is that the carbonaceous adsorbent is used as the reducing agent, therefore large losses of adsorbent, known as "burn-off," occur. Regeneration is carried out according to the following reaction:

$$H_2SO_4 + \tfrac{1}{2}C \rightarrow SO_2 + \tfrac{1}{2} CO_2 + H_2O \qquad (1)$$

Consumption of an activated carbon at the rate needed for regeneration according to reaction (1), i.e., about 0.1 pounds of carbon per pound of sulfur dioxide recovered, is economically unattractive. Because of the necessity of replacing a substantial portion of the adsorbent with each adsorption and regeneration cycle, it is necessary that an inexpensive "char" be employed. These chars generally have low adsorption rate and capacity characteristics necessitating large adsorber sizes to compensate for these poor characteristics. Another disadvantage is that the inexpensive char, which has a low hardness, becomes structurally weaker and more subject to attrition as a result of burnoff during regeneration.

The usual regeneration treatment is to heat the spent adsorbent which causes the sulfur trioxide to react with the adsorbent in accordance with reaction (1), thereby producing a concentrated stream of sulfur dioxide; whereas, another process washes the adsorbent with water to remove the adsorbed sulfuric acid in dilute concentrations. Therefore, chemical reduction is the preferred regeneration method because a concentrated stream of sulfur dioxide is recovered as a 40% to 50% gas mixture which can be processed economically in that state or used as a raw material for the production of sulfur or sulfuric acid.

It is a general object of this invention to provide a process for regenerating a carbonaceous adsorbent having sulfur oxides adsorbed thereon without consuming the adsorbent. A more specific object is to provide a continuous process for removing sulfur dioxide and sulfur trioxide from flue gases whereby the oxides are adsorbed onto activated carbon and the spent carbon is then contacted with an oxide-reducing gas which will reduce the adsorbate to sulfur dioxide and sulfur without burn-off losses. For the purpose of this invention the term "adsorbate" is construed to mean adsorbed sulfur trioxide, adsorbed sulfuric acid, and varying amounts of both sulfuric acid and sulfur trioxide. A further object is to provide a regenerating process employing a hard granular activated carbon possessing high rate and capacity characteristics. A still further object is to provide a process for sequential removal of sulfur trioxide and sulfur dioxide, thereby permitting the gas stream to pass to the atmosphere free from the sulfur oxide pollution.

For the purposes of the instant invention, the term "oxide-reducing gas" is defined to mean all compounds which will reduce adsorbed sulfur trioxide ($SO_3$) per se or in the hydrated form as sulfuric acid, to sulfur dioxide ($SO_2$). Such compounds include hydrogen sulfide ($H_2S$) and carbonyl sulfide (COS).

It has now been found that removal of adsorbed sulfur oxides from spent carbonaceous adsorbent may be accomplished without carbon burn-off by contacting the adsorbent with an oxide-reducing gas, preferably hydrogen sulfide. "Spent adsorbent" is the term used to describe the condition of the adsorbent after it has adsorbed sulfur oxides from a gas stream as sulfur trioxide and sulfuric acid, or a combination of both. Spent adsorbent is contacted with an oxide-reducing gas whereby the adsorbate is reduced, and sulfur dioxide is continuously purged from the regenerator. It has also been found that the use of this preferred method allows utilization of a hard granular carbon having superior adsorption rate and capacity characteristics and a low attrition rate as the adsorbent. The adsorption and regeneration may be carried out in a fixed bed system or a continuously moving bed system, but the preferred process utilizes a fluidized bed system wherein the carbon adsorbent is continuously circulated through the system.

The dirty flue gas is passed countercurrent to the continuously moving carbon adsorbent and the sulfur oxides are adsorbed therefrom. The sulfur oxide removal efficiency of the process can be designed to be as high as required, for example, the gas stream as it passes to the atmosphere may be reduced to less than 5 p.p.m. of sulfur from an initial concentration of 1,000 to 50,000 p.p.m. However, for economic reasons, it is usually preferable to adsorb about 90% of the sulfur oxides from the gas stream.

The flue gas entering the sulfur oxide adsorber may contain sizeable amounts of solid materials such as fly ash and dust. This material does not noticeably impair the adsorption characteristics of the activated carbon when a fluidized bed system is used because the adsorption bed is in a dynamic state.

Physical adsorption of sulfur dioxide by activated carbon at flue gas temperatures is very low, but sulfur trioxide by comparison is readily adsorbed. Consequently, satisfactory removal from the gas stream depends upon the carbon acting as a catalyst in the oxidation of sulfur dioxide to sulfur trioxide which is hydrolyzed to sulfuric acid if water vapor is present in the flue gas. The oxygen and water vapor necessary for the reaction are normally present in the flue gas, but they may be added if desired. The sulfuric acid thus formed is retained on the carbon surface and in this manner sulfur oxides are removed.

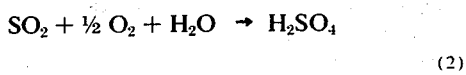

(2)

One of the advantages of an activated carbon process is that sulfur oxide removal may be performed at flue gas temperatures. The lower sulfur oxide adsorption temperature is kept above 200°F. in order to retain buoyancy. The upper adsorption limit is determined by the reaction and ignition characteristics of the particular carbon used. For one particular carbon the adsorption of sulfur oxides takes place at temperatures up to about 350°F. Where corrosion problems are not a factor the adsorption of both sulfur trioxide and sulfur dioxide may be accomplished simultaneously. The preferred temperature for sulfur oxide adsorption is between 200° and 260°F. in order to retain buoyancy and satisfactory adsorption rate and capacity characteristics. If buoyancy is not a factor the adsorption may take place at temperatures below 200°F. In adsorber units where corrosion by sulfur trioxide is a problem the adsorption of sulfur oxides is performed sequentially, using a single adsorbent so as to first adsorb the sulfur trioxide while it is at a temperature above its dew point and then to oxidize and adsorb the sulfur dioxide as mentioned above. The dew point of sulfur trioxide in most flue gases ranges between 250°F. and 480°F., which is much higher than the dew point of sulfur dioxide. Because of this difference, it is desirable to adsorb sulfur trioxide in one portion of the adsorber at a temperature above the dew point of sulfur trioxide, preferably between 300° and 350°F., and adsorb sulfur dioxide in another portion of the adsorber at a temperature below the dew point of sulfur trioxide, preferably 200° to 260°F.

Any carbonaceous adsorbent may be used in the process of this invention, but an activated carbon is preferred. Since the regeneration procedure does not consume the activated carbon adsorbent, a highly activated, more effective hard carbon, such as those disclosed in co-pending application Ser. No. 734,566, now abandoned, may be used. Through the ability to use the more highly activated carbons, the throughput of gas per volume of carbon can be increased by five to seven times more than the throughput with activated char. This achievement means a significant reduction in the size of the adsorption equipment required for a sulfur dioxide recovery process. In addition, hard activated carbons are much less subject to abrasion than are chars, the result being lower attrition losses.

The essence of this invention is that regeneration may be efficiently carried out by using hydrogen sulfide as the oxide-reducing gas for recovering sulfur dioxide from spent carbons. Although a number of reactions may be postulated under the proper regeneration conditions the stoichiometry is described by the following reactions:

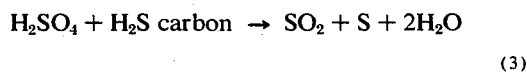

(3)

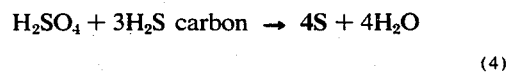

(4)

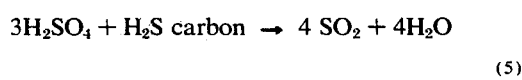

(5)

The carbon burn-off during these regenerations is negligible and the sulfur formed by reactions (3) and (4) remains adsorbed on the carbon surface. It is believed that the carbon acts as a catalyst not only in the adsorption of sulfur oxides but in the regeneration as well. The proportions of reactions (3), (4) and (5) occurring is a function of the regenerating temperature, which may vary between ambient temperature and 570°F. It has been found that when using one particular carbon at temperatures below 250°F. reaction (4) predominates and sulfur remains adsorbed on the carbon. As the regeneration temperature is raised above 250°F. reaction (3) is favored and the percentage of sulfur dioxide evolved is increased. It has been shown that although regeneration may be carried out at temperatures above 570°F., complete sulfur trioxide and sulfuric acid reduction may be accomplished at temperatures below 570°F. The sulfur dioxide formed is continuously purged and conveyed from the regenerator to further processing as indicated above. When using carbonyl sulfide as the oxide-reducing gas, an analogous set of reactions for the reduction of sulfuric acid may be made. It is understood, of course, that where there is an inadequate amount of water necessary for formation of sulfuric acid during adsorption, the reduction will be of sulfur trioxide.

The treated adsorbent having sulfur on its surface may be conveyed to other processing or may be discarded. For example, the carbon containing sulfur may be used in regenerating as described in co-pending application Ser. No. 724,777 filed Apr. 29, 1968, now U.S. Pat. No. 3,667,908, issued June 6, 1972, or the carbon may be carried to a second regenerator to remove the adsorbed sulfur such as described in co-pending application titled "Removal and Recovery of Sulfur Oxides from Gases" filed on even date herewith, now U.S. Pat. No. 3,563,704, issued Feb. 16, 1971.

The product distribution may be tailored by adjustment of regeneration parameters because simultaneous reactions in sulfur dioxide recovery occur. For example, if only reaction (5) occurs, sulfur dioxide is the only product and the consumption of oxide-reducing gas is at a minimum. If elemental sulfur is desired as a product, the parameters are adjusted so that reactions (3) and (4) predominate.

The advantages offered by this invention include the ability to use a process whereby burn-off of activated carbon may be virtually eliminated. A second advantage is the ability to use a carbon possessing superior adsorption-rate and capacity characteristics. Regeneration by chemical reduction has the further advantage of producing a stream concentrated in sulfur dioxide which can be further processed to such products as liquid sulfur dioxide, sulfuric acid or sulfur. Another advantage is that this invention may be carried out in either a fixed bed or in a continuous manner, such as a fluidized bed.

The above and other objects of the present invention will become more readily apparent from the following description of the drawing, the figure being a schematic flow diagram for carrying out the present invention.

FIG. 1 is a schematic drawing of the process of this invention.

The drawing, describing the process as a moving bed process for removing sulfur dioxide with hydrogen sulfide, uses these specific terms by way of reference for simplicity in showing one aspect of the invention. In the Figure, activated carbonaceous adsorbent 13 is fed to the sulfur dioxide adsorber 11 and catalyzes the oxidation of sulfur oxides contained in the dirty flue gas stream 10. The adsorbate remains on the carbon surface as the gas stream passes through the adsorber countercurrent to the moving bed of adsorbent. Clean flue gas 12, having substantially all the sulfur oxides removed, or only an insignificant amount remaining, passes to the atmosphere. The carbon containing the adsorbate is moved via 15 into the regenerator 16 where it is contacted with an oxide-reducing gas, shown here as hydrogen sulfide 20. Sulfur dioxide and sulfur are formed from the chemical reduction of the adsorbate according to reaction (3), and sulfur dioxide is recovered in concentrated stream 22 suitable for further processing; elemental sulfur may be formed according to reaction (4) or the conditions may be adjusted to give intermediate proportions. The reaction conditions also allow the formation of sulfur dioxide only according to reaction (5). The carbonaceous adsorbent is removed from the regenerator at 17 and may be further processed, discarded, or recycled to the sulfur dioxide adsorber.

The processes outlined above substantially eliminate the carbon burn-off encountered when using the activated char process, thereby allowing the use of a highly adsorbent carbon. In addition, the activated carbon upon recycle retains a constant level of effectiveness for removing sulfur oxides from gas streams.

The practice of this invention may clearly be seen in the following example.

EXAMPLE 1

The amount of burn-off of activated carbon during regeneration was determined by first treating a spent adsorbent with hydrogen sulfide and measuring the amount of CO and $CO_2$ formed by the reaction of the carbon adsorbent found in the effluent gas stream.

A degree of adsorption of 12 grams of sulfur dioxide per 100 grams of carbon was chosen. The sulfur dioxide was adsorbed from a simulated flue gas stream having the following composition:

| Component | Percent by Volume |
|---|---|
| $SO_2$ | 0.3 |
| $O_2$ | 3.4 |
| $H_2O$ | 6.9 |
| $CO_2$ | 11.6 |
| $N_2$ | 77.8 |

Adsorption was carried out in a one-inch diameter cylindrical adsorber charged with 100 cc of a hard granular carbon in a fixed bed. The gas stream was passed downward through the carbon bed at a temperature of 203°F. and a space velocity of 2000/hr.

Regeneration was carried out by exposing the spent carbon to a stream of $H_2S$, at a concentration of 11.6% by volume in a helium carrier. The helium was used as a carrier to simplify analytical procedures, but in practice any inert gas would be suitable. The regeneration was begun at ambient temperature with the temperature increasing steadily to 450°F. in 150 minutes. The space velocity was 120/hr., which is equivalent to a gas-contact time of approximately 10 seconds at 450°F. The effluent gas stream was monitored for $SO_2$, $H_2S$, CO and $CO_2$. The amounts of gases were measured quantitatively and the amounts of CO and $CO_2$ in the effluent gas stream were used to determine the amount of carbon burn-off. Analysis for CO and $CO_2$ showed that carbon burn-off was 1 mole carbon per 100 moles of adsorbed sulfur dioxide, which is a burn-off of 0.02% of the carbon adsorbent. Analysis of the effluent stream for recovered $SO_2$ showed that 86% of the adsorbed $H_2SO_4$ was recovered with the rest remaining adsorbed as elemental sulfur.

While the invention has been described and illustrated herein by references to various specific materials, procedures, and examples, it is understood that the invention is not restricted to the particular materials, combinations of materials, and procedures selected for that purpose. Numerous variations of such details can be employed, as will be appreciated by those skilled in the art.

We claim:

1. A process for regenerating a hard granular activated carbon adsorbent having sulfuric acid adsorbed thereon comprising; contacting the activated carbon having sulfuric acid adsorbed thereon with an oxide-reducing gas selected from the group consisting of hydrogen sulfide and carbonyl sulfide at a temperature between ambient and about 570°F. and sufficient to reduce the adsorbed sulfuric acid to at least one substance from the group consisting of elemental sulfur and sulfur dioxide without substantial burn-off of activated carbon, and removing the thus-reduced substance from said activated carbon.

2. The process of claim 1 wherein said reduced substance is sulfur dioxide.

3. The process of claim 1 wherein said activated carbon having sulfuric acid adsorbed thereon is contacted with hydrogen sulfide at a temperature below 250°F. to convert all of said adsorbed sulfuric acid and hydrogen sulfide to elemental sulfur and water vapor.

4. The process of claim 1 wherein said oxide-reducing gas is hydrogen sulfide.

5. The process of claim 1 wherein said oxide-reducing gas is carbonyl sulfide.

6. The process of claim 1 wherein said activated carbon is treated at a temperature between 250° and 570°F.

7. A continuous process for removing sulfur oxides from an oxygen-containing gas stream comprising;
   a. passing the gas stream into contact with a hard granular activated carbon adsorbent at a temperature between 200°F. and 450°F. to adsorb the sulfur oxides onto said activated carbon adsorbent as sulfuric acid,
   b. continuously regenerating said activated carbon adsorbent having sulfuric acid adsorbed thereon by contacting said adsorbent with an oxide-reducing gas from the group consisting of hydrogen sulfide and carbonyl sulfide at a temperature between 250° and 570°F. for a period sufficient to reduce said adsorbed sulfuric acid to a member from the group consisting of sulfur dioxide, elemental sulfur and combinations thereof without substantial burn-off of activated carbon, and
   c. removing said reduced member from said activated carbon adsorbent.

8. The process of claim 7 wherein said gas stream is contacted at a temperature between 200°F. and 260°F.

9. The process of claim 7 wherein said continuous process is carried out in a fluidized bed.

10. The process of claim 7 wherein said oxide-reducing gas is hydrogen sulfide.

11. The process as defined in claim 7, further comprising;
   d. recycling the activated carbon adsorbent from which said reduced member has been removed into contact with said gas stream.

* * * * *